United States Patent [19]
Haag et al.

[11] Patent Number: 4,951,626
[45] Date of Patent: Aug. 28, 1990

[54] ELECTRICALLY CONTROLLED FUEL INJECTION PUMP

[75] Inventors: Gottlob Haag, Markgroeningen; Ernst Linder, Muehlacker; Helmut Rembold, Stuttgart, all of Fed. Rep. of Germany

[73] Assignee: Robert Bosch GmbH, Stuttgart, Fed. Rep. of Germany

[21] Appl. No.: 423,062

[22] Filed: Oct. 18, 1989

Related U.S. Application Data

[63] Continuation-in-part of Ser. No. 299,587, Jan. 23, 1989, Pat. No. 4,879,984.

[30] Foreign Application Priority Data

Feb. 10, 1988 [DE] Fed. Rep. of Germany ....... 3804025
Oct. 22, 1988 [DE] Fed. Rep. of Germany ....... 3836048
Dec. 31, 1988 [DE] Fed. Rep. of Germany ....... 3844469

[51] Int. Cl.$^5$ ............................................. F02M 39/00
[52] U.S. Cl. ..................................... 123/300; 123/450; 417/462
[58] Field of Search ............... 123/450, 447, 506, 299, 123/300, 458; 417/462, 221

[56] References Cited

U.S. PATENT DOCUMENTS

| | | | |
|---|---|---|---|
| 2,930,369 | 3/1960 | Halberg | 123/450 |
| 2,974,657 | 5/1961 | Bessiere | 123/450 |
| 4,001,274 | 7/1986 | Seilly | 417/462 |
| 4,180,037 | 12/1979 | Hobo | 417/462 |
| 4,224,903 | 9/1980 | Mowbray | 123/300 |
| 4,351,295 | 9/1982 | Bassoli | 123/300 |
| 4,457,277 | 7/1984 | Adey | 123/450 |
| 4,470,760 | 9/1984 | Jarrett | 123/300 |
| 4,696,271 | 9/1987 | LeBlanc | 123/299 |
| 4,709,673 | 12/1987 | Babitzka | 123/299 |
| 4,879,984 | 11/1989 | Rembold | 123/450 |

FOREIGN PATENT DOCUMENTS

| | | | |
|---|---|---|---|
| 161969 | 3/1955 | Australia | 123/450 |
| 2136431 | 1/1972 | Fed. Rep. of Germany | 123/450 |

*Primary Examiner*—Carl Stuart Miller
*Attorney, Agent, or Firm*—Edwin E. Greigg

[57] ABSTRACT

An electrically controlled fuel injection pump for internal combustion engines, in particular for direct fuel injection in engines having externally supplied ignition contains a plurality of pump pistons driven by a single common cam. The pumping quantity of fuel is delivered by pumping pistons is controlled via a rotary slide valve to the injection nozzles at the injection sites of the engine, wherein the quantity control is effected by an electrically controlled valve. An axial conduit of the rotary slide which discharges into control bores or control grooves distributed over the circumference of the rotary slide and cooperates with the pump work chamber and the pressure lines to the injection sites and is adjoined by at least one further control bore or control groove which communicates with a pressure reservoir. By this means, a preinjection, separate from a main injection, is made possible at the top dead center charge change.

16 Claims, 4 Drawing Sheets

ELECTRICALLY CONTROLLED FUEL INJECTION PUMP

RELATED PATENT APPLICATION

This application is a continuation in part of application Ser. No. 299,587 filed Jan. 23, 1989, now U.S. Pat. No. 4,879,984.

BACKGROUND OF THE INVENTION

The invention is based on a fuel injection pump and more particularly to an electrically controlled fuel injection pump for internal combustion engines.

In a fuel injection pump known from U.S. Pat. No. 4,459,963 to Gross et al, two pump pistons disposed side by side in a fuel injection pump housing are provided, each driven by a separate camshaft. Each of the pump pistons feeds into a separate single fuel injection line, associated with that piston, to a fuel injection valve of the associated internal combustion engine. The control of the injection quantity is effected via a common overflow conduit, which can be opened to a relief space by means of a magnetic valve. Also, the pump pistons execute their pumping strokes in alternation; to prevent the quantity of fuel pumped at high pressure by one pump piston from being able to flow out to the relief side during an intake or filling stroke of the other pump piston, a slide valve control is provided. The pump piston itself, with a control edge, acts as the valve slide. As an alternative, check valves are also provided, in the fuel fill line to the individual pump work chambers among other locations. The known fuel injection pump is thus designed as a kind of in-line injection pump, with each pump piston serving to supply fuel to one injection site.

In the embodiment according to the parent invention, the pump pistons are driven by a common cam, and the overflow conduit has conduit segments that begin in the pump work chambers and discharge in a guide bore of a rotationally driven distributor, embodied as a slide of a rotary slide valve, which has a recess via which, in the course of the distributor rotation, at least two of the segments of the overflow conduit of the pump piston executing a pumping stroke at that time communicate with one another. A part of the overflow conduit that extends onward from the recess communicates with a distributor opening on the distributor, by means of which pressure lines leading to the injection sites are made to communicate successively with the overflow conduit during the rotation of the distributor. An object of this invention is to obtain a fuel supply to a plurality of injection sites, and a plurality of pump pistons cooperate, to attain the high injection pressure for one injection site. In this way, with a compact fuel injection pump, a high pumping rate is attained, which is continuously available successively to each injection nozzle. In the central guide of a rotary slide valve of this type, it is possible to build up a desired injection pressure, and depending on the rotational position of the rotary slide valve, injection valves are acted upon by the pump pressure until such time as a corresponding speed regulation takes place, for instance by opening of an electrically controlled valve to a relief chamber. With the embodiment of the injection pump of the parent patent application filed Jan. 23, 1989, it was not readily possible to make a selection of the instant of injection for a preinjection independently of and without impairing a main injection.

OBJECT AND SUMMARY OF THE INVENTION

Based on the embodiment of the fuel injection pump of the parent patent application, it is possible with the electrically controlled fuel injection pump according to the present invention, to divide the injection into a preinjection at an instant that is selectable within wide limits, and a main injection, adapting the course of the injection to prevailing requirements by the selection of the size and disposition of the control bores of the control slide. This makes it simple to enable a preinjection of fuel at the time of a charge change, OT (top dead center), for an increase in load at full load, yet executing a preinjection has no influence on a main injection possibly taking place at that same time in a further cylinder. With such an embodiment, it is in principle possible to pump into the pressure reservoir whenever no injection event is taking place, and in this way it can be assured that pressure peaks in the control slide and in the connecting lines or conduits between the work chambers of the pump pistons and the high-pressure conduits in the control slide are avoided.

Further advantageous features of the invention are defined herein. The pressure reservoir can be used to perform a preinjection in one cylinder at the OT charge change at an instant when a main injection is not simultaneously taking place in that cylinder. To this end, the embodiment is advantageously such that on its jacket, separate from the axial conduit of the rotary slide, the rotary slide has a connecting bore or groove via which each injection valve can be connected separately to the pressure reservoir in a rotational position different from that in which the axial conduit communicates with the injection valve.

To enable simple prevention of a preinjection if desired, this embodiment can be improved provided that the pressure reservoir communicates with the connecting bore or groove on the jacket of the rotary slide via a magnet valve, which in the unloaded position blocks the communication between the pressure reservoir and the rotary slide; preferably, because the pressure reservoir communicates with the axial channel of the rotary slide via a check valve closing toward the pressure reservoir, it is possible to prevent the pressure reservoir from losing pressure when the magnet valve is opened to regulate an injection event.

In order to charge the pressure reservoir outside the pumping range intended for a main injection, and to reliably avoid any effect during the injection of possible pressure fluctuations arising from the charging of the reservoir, the embodiment is advantageously such that via the control bore or control groove of the rotary slide, the pressure reservoir can be acted upon with the pump pressure of the pump pistons in a rotational position different from that in which the pressure reservoir and/or the axial conduit communicates with an injection valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
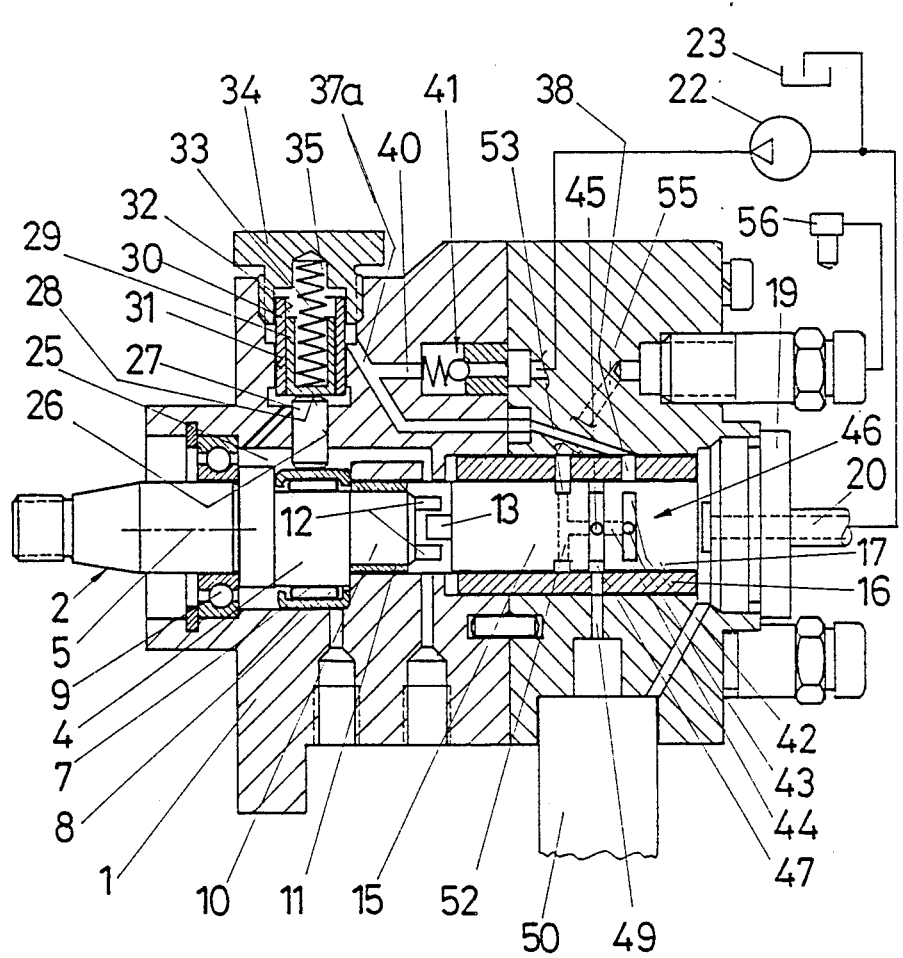
FIG. 1 shows a section through the fuel injection pump of the parent patent application.

In the distributor fuel injection pump according to the parent patent application, shown in FIG. 1, a drive shaft 2 is supported in a pump housing 1. The driveshaft enters the housing from the outside, and a drive cam 4 is disposed horizontally on the drive shaft inside the housing. As its cam race, this cam has a circular race 7, which is eccentric with respect to the axis 5 of the drive shaft 2, and preferably a roller or needle bearing 8 is disposed on the race 7. Where the drive shaft passes through the housing it is supported on a ball bearing 9, and on its opposite end portion, adjacent to the drive cam 4, it is embodied as a tang 10 that is supported in a slide bearing 11 introduced into the housing. On its face end, the tang has axially extending coupling claws 12, which cooperate with corresponding coupling claws 13 of a fuel distributor 15 that is coaxial with the axis 5 of the drive shaft and tang 10 and is embodied as a rotary slide valve. The fuel distributor is supported in a guide bore 17, embodied by a cylinder liner 16, which is closed on one end remote from the drive shaft by a stopper 19 introduced into the housing 1; the stopper and the tang 10 together axially secure the distributor between the drive shaft and the stopper. A fuel leakage line 20 leads through the stopper and connects with a return fuel line to the fuel tank, or to the intake side of a fuel feed pump 22, which supplies fuel to the fuel injection pump from a fuel tank 23.

In a radial plane to the drive cam, radial bores 26, only one of which is shown in FIG. 1, originate at the chamber 25 in the fuel injection pump housing 1 that receives the cam 4 and needle bearing 8. A pump piston tappet 27 is displaceable in each of these bores, resting with one end on the needle bearing 8 and with the other end on the outer face end 28 of a spring loaded cup-shaped pump piston 29. This piston 29 is guided in a cylinder bore 32 of a cylinder liner 30, which is installed in a bore 31 in axial alignment with and adjoining the radial bore 26. The inner end of the pump piston is engaged by a compression spring 33, which is supported on its other end by a stopper 34 closing the bore 31. The spring keeps the pump piston in contact with the pump tappet 27, and keeps the tappet 27 in turn in contact with the cam 4. A pump work chamber 35 is enclosed between the stopper 34, the cylinder liner 30 and pump piston 29; a conduit segment 37a of an overflow conduit leads away from this work chamber to an overflow opening 38 in the cylinder liner which discharges in a radial plane of the guide bore 17. In addition to the above-described pump piston and conduit segment 37a, three other pump pistons are distributed at regular intervals about the axis 5 in the pump housing, i.e. one pump piston for each cylinder. Further conduit segments lead from the corresponding pump work chambers 35 to the guide cylinder 17. Discharging into each of the conduit segments is a respective fill line 40, which branches off from the feed side of the fuel feed pump 22 and includes a one-way check valve 41 which opens in a direction of the pump work chamber. Instead of the check valve, a rotary slide valve may also be provided, which opens the fill line flow in the intake phase of the pump piston. The distributor itself is embodied as a rotary slide and has corresponding longitudinal control grooves.

In the radial plane defined by the discharge points of the overflow openings 38, the distributor is embodied as a rotary slide 46, and to this end has a recess that in this exemplary embodiment comprises a semi-annular groove 42 that extends over an angle of 180° and continuously connects at least two of the conduit segments with one another. Beginning at the semi-annular groove 42, a radial bore 43 extends to a longitudinal bore 44 that is closed on both ends of the distributor. Via this longitudinal bore 44 and a further radial bore 45, the partial annular groove 42 communicates with an outer, full annular groove 47 in the jacket face of the distributor. Leading away from the guide bore 17 in the vicinity of this outer annular groove is a relief line 49, which may communicate with the leakage line 20, for example, and the flow cross section of which can be opened or closed by an electrically controlled valve 50.

A further radial bore 52 leads away from the longitudinal bore 44 to a distributor opening 53 on the jacket face of the distributor. In the radial plane defined by this distributor opening, pressure lines 55 lead away from the guide bore 17, each communicating, optionally via an interposed check valve or relief valve, with a fuel injection valve 56 associated with the particular injection site on the engine. Such pressure lines 55 are distributed about the circumference of the guide bore 17 in accordance with the number of cylinders or engine injection sites to be supplied. They are supplied with fuel at injection pressure upon appropriate pump piston pumping strokes, in alternation with the rotation of the distributor. The duration of the injection is determined by the electrically controlled valve 50, which is triggered by a suitable control circuit and defines the onset of fuel injection upon the closure of the relief line and the end of injection upon the opening of the relief line. At the same time, both the injection quantity and the phase relation of the injection are thus determined.

Figure 2:
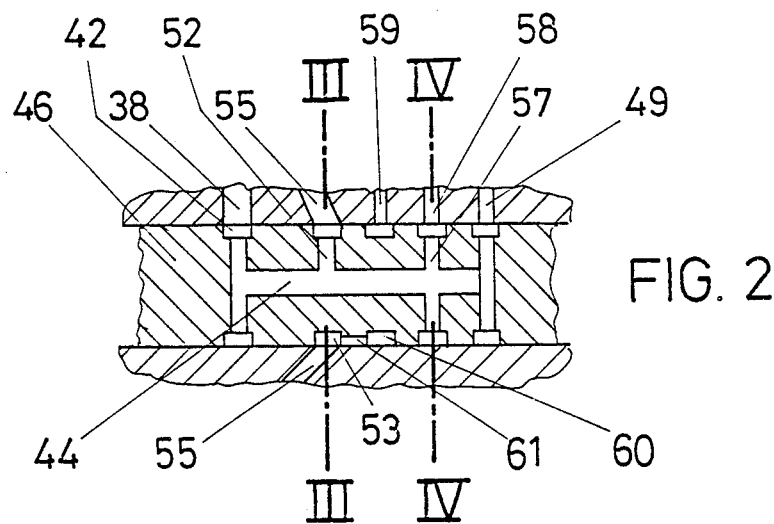
FIG. 2 shows an embodiment of a rotary slide of a fuel injection pump according to the invention, which additionally has control bores or control grooves for a communication with a pressure reservoir.

FIG. 2 shows an embodiment according to the invention of a rotary slide valve 46 which besides having a substantially similar structure to the rotary slide valve of FIG. 1 makes the attachment of a pressure reservoir possible. As in FIG. 1, the introduction of fuel at high pressure is effected via or into the rotary slide valve 46 through the overflow opening 38, which communicates with corresponding pump work chambers via the conduit segments. The control of the injection events in the pressure lines 55 leading to injection valves, not shown, is in turn effected via a magnetic valve connected to the line 49, which communicates with the axial conduit or longitudinal bore 44. The axial conduit 44, which is at the pumping pressure of the pump pistons, has not only the control bores or grooves 42, 53, 47 for communication with the pump pistons and the injection lines 55, but also the magnetic valve 50 for controlling control bores 57 in a further radial plane, which communicate with a line 58 to a pressure reservoir shown in further detail in FIGS. 5 and 6. A line 59 also adjoins the rotary slide valve 46, delivering fuel at reservoir pressure from the aforementioned pressure reservoir to the rotary slide valve 46 and discharging the fuel into an annular groove 60 provided on the circumference of the rotary slide valve 46. This annular groove 60 communicates with a conduit 61 extending in the axial direction of the rotary slide valve 46 and at a suitable rotational position of the rotary slide valve 46 enables communication with an injection line 55 to an injection valve, which in that rotational position does not commuicate with the longitudinal bore or axial conduit 44. It is thus possible to execute not only a main injection, which is effected by the pumping of fuel from the axial conduit 44 into an injection line 55, but also, at top dead center of the fuel injection charge change, a preinjection is executed into a further injection valve.

Figures 3, 4:
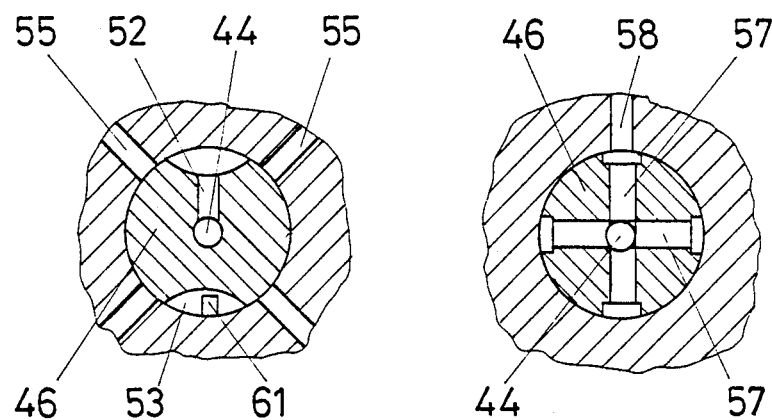
FIGS. 3 and 4 are sections taken along the lines III—III and IV—IV, respectively, of FIG. 2 through different cross-sectional planes of the rotary slide.

From FIGS. 3 and 4, it is clear that the charging process takes place in each case only outside the main pumping range of the pump pistons, that is, outside the main injection into an injection valve. The control bores to the injection lines 55, or to the line 58 to the pressure reservoir, or the lines in the pump housing itself, are correspondingly disposed offset with respect to one another.

Figure 5:
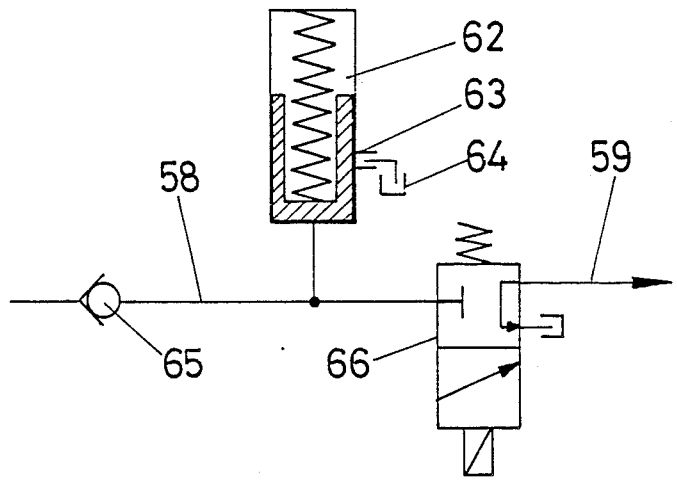
FIG. 5 shows a first embodiment of a pressure reservoir for a fuel injection pump according to the invention.

FIG. 5 shows a first version of a pressure reservoir, in the form of a spring reservoir 62 connected to line 58. Via the line 58, the spring reservoir 62 is supplied with fuel under pressure, and to prevent an overload of the reservoir, a diversion bore 63 is provided, which discharges into a return line or tank 64. To prevent the pressure conditions possibly prevailing under some conditions in the high-pressure circuit of the rotary slide valve 46 from affecting the reservoir pressure in the spring reservoir 62, or to reliably preclude a flow of fuel at high pressure back via the line 58 back into the rotary slide valve 46, a one-way check valve 65 is provided in the line 58 from the rotary slide valve. To initiate a preinjection via line 58, a magnetic valve 66 of the 3/2-way type is installed in the line 59 leading from the reservoir 62 to the rotary slide 46 and connected to line 58. By providing a magnetic valve 66 of this type, the injection event of the preinjection can be controlled accordingly.

Figure 6:
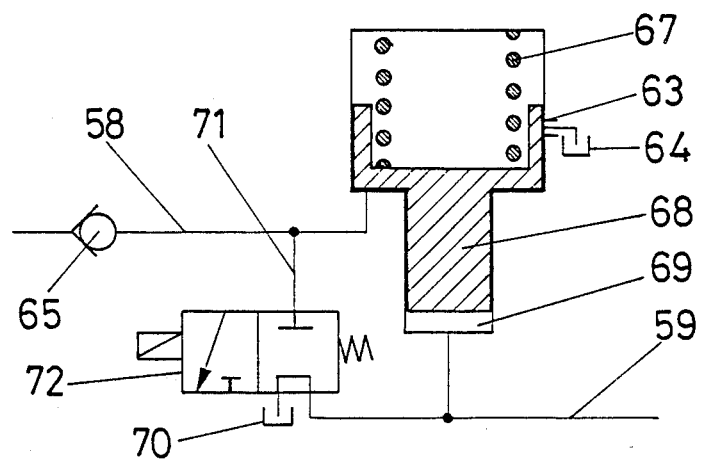
FIG. 6 shows a modified embodiment of a pressure reservoir for a fuel injection pump according to the invention.

In FIG. 6, a stepped piston 68 acted upon by a spring 67 is used as the pressure reservoir, and in turn it can be acted upon with fuel at pumping pressure via the line 58. When the stepped piston 68 is so acted upon, fuel is aspirated into a further work chamber 69 as well as into the line 59. The initiation of the preinjection of the fuel contained in the separate work chamber 69 is effected by the switchover of the magnetic valve 72 installed in a line 71 branching off from the line 58, so that by means of a reciprocating motion of the stepped piston 68 caused by the prestressed spring 67, a preinjection takes place via the line 59. The preinjection is effected either by the end position, shown in FIG. 6, of the stepped piston 68, or by a repeat actuation of the magnetic valve 72, as a result of which the separate work chamber 69 or the line 59 is in communication with the return lin 70. A one-way check valve 65 provided in the line 58 prevents the relief of the stepped piston 68 via the branch line 71 from affecting the pressure conditions prevailing in the rotary slide valve 46.

Figure 7:
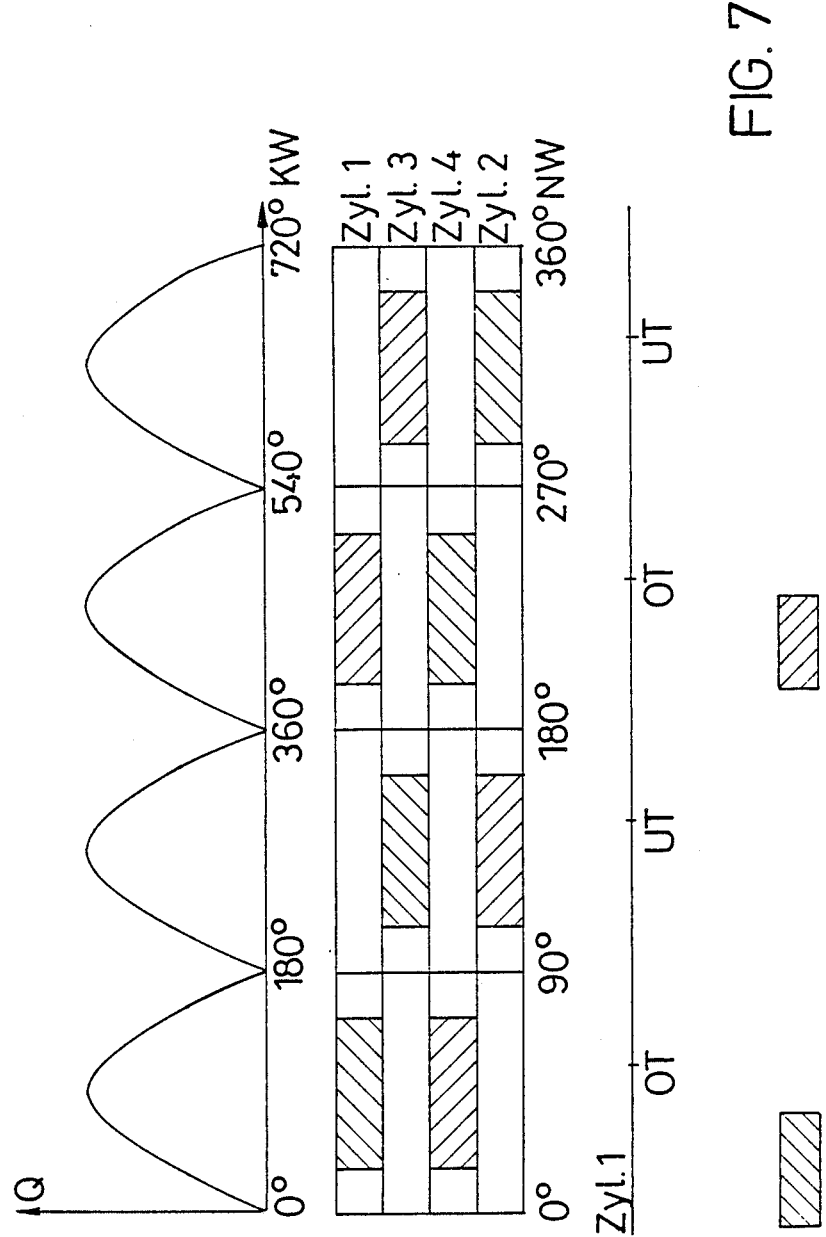
FIG. 7 is a control diagram of the instants of injection.

In FIG. 7, a diagram of the injection events of a fuel injection system of a four-cylinder internal combustion engine is shown. On the abscissa, the crankshaft angle KW and the camshaft angle NW are shown. As schematically shown for one cylinder, the injection is divided into a preinjection and a main injection, as described above, via the embodiment of the rotary slide valve 46, with an additional connection option for a pressure reservoir. For the first cylinder, it is also shown that the preinjection takes place at the OT charge change, as can be performed for the other cylinders as well with a suitable rotational position of the rotary slide valve 46. The definition of both the instant of injection and the injection quantity, as well as of the main injection and the preinjection takes place in turn via the controlled relief of the axial conduit 44 of the rotary slide valve 46 via the magnetic valve 50. By using the pressure reservoir, a preinjection into a second cylinder that takes place independently of a main injection into a first cylinder can be performed purposefully, without affecting the high-pressure conditions in the axial conduit 44 in an execution of a main injection. The execution of the preinjection at the OT charge change makes it possible to increase the load at full load.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electrically controlled fuel injection pump for direct fuel injection in internal combustion engines, which comprises a housing, a drive shaft in said housing, a drive cam on said drive shaft, a plurality of cylinder bores equally dispersed about said drive cam, pump pistons in each of said cylinder bores driven at a constant stroke by said drive cam rotated with said drive shaft, each of said pump pistons enclosing an associated pump piston work chamber pumping into said cylinder bore to pump fuel under injection pressure to an injection valve, a relief conduit extending from said pump piston work chamber to a low pressure chamber, an electrically controlled valve disposed to block a flow of fuel overflowing via said relief conduit, an overflow conduit into which a slide valve is disposed in said overflow conduit, said slide valve being moved in synchronism with said drive shaft to block communication between the pump work chambers and said overflow conduit; said overflow conduit having conduit segments, extending from the pump piston work chambers, a distributor driven in rotation by said drive shaft and embodied as a slide of a rotary slide valve, said overflow conduits discharge in a guide bore of said distributor, said distributor having a recess via which in a course of distributor rotation at least two at a time of said conduit segments of said overflow conduit of said pump pistons execute a pumping stroke that communicates with a distributor opening on said distributor, pressure lines juxtaposed said distributor, rotation of said distributor opening pressure lines that lead to injection sites which are connected to the overflow conduit in succession during the rotation of the distributor, an axial conduit (44) in said distributor, said axial conduit (44) of said distributor (46), discharging into control bores or control grooves (42, 47, 53) that are distributed over the circumference of the distributor (46) and communicating with the conduit segments (37a) originating at the pump piston work chambers (35) and cooperate with pressure lines (55) to said injection sites (56) and said axial conduit (44) is acted upon by the pump pressure of the pump pistons (29), said axial conduit (44)

adjoined by at least one further control bore or control groove (57), which communicates with a pressure reservoir (62, 68).

2. A fuel injection pump as defined by claim 1, in which said rotary slide (46) has on its jacket a connecting bore or groove (60, 61), separate from said axial conduit (44) of the rotary slide, via which bore or groove (60, 61) each injection valve is connectable separately with the pressure reservoir (62, 68) in a rotational position different from the rotational position in which the axial conduit (44) communicates with the injection valve (56).

3. A fuel injection pump as defined by claim 1, in which said pressure reservoir (62, 68) communicates with said axial conduit (44) of the rotary slide valve (46) via a check valve (65) closing toward the pressure reservoir.

4. A fuel injection pump as defined by claim 2, in which said pressure reservoir (62, 68) communicates with said axial conduit (44) of the rotary slide valve (46) via a check valve (65) closing toward the pressure reservoir.

5. A fuel injection pump as defined by claim 1, in which said pressure reservoir (62, 68) communicates with the connecting bore or groove (60, 61) on the jacket of said rotary slide valve (46) via a magnetic valve (66, 72), which in an unloaded position blocks fuel flow communication (59) between the pressure reservoir (62, 68) and the rotary slide valve (46).

6. A fuel injection pump as defined by claim 2, in which said pressure reservoir (62, 68) communicates with the connecting bore or groove (60, 61) on the jacket of said rotary slide valve (46) via a magnetic valve (66, 72), which in an unloaded position blocks fuel flow communication (59) between the pressure reservoir (62, 68) and the rotary slide valve (46).

7. A fuel injection pump as defined by claim 3, in which said pressure reservoir (62, 68) communicates with the connecting bore or groove (60, 61) on the jacket of said rotary slide valve (46) via a magnetic valve (66, 72), which in an unloaded position blocks fuel flow communication (59) between the pressure reservoir (62, 68) and the rotary slide valve (46).

8. A fuel injection pump as defined by claim 4, in which said pressure reservoir (62, 68) communicates with the connecting bore or groove (60, 61) on the jacket of said rotary slide valve (46) via a magnetic valve (66, 72), which in an unloaded position blocks fuel flow communication (59) between the pressure reservoir (62, 68) and the rotary slide valve (46).

9. A fuel injection pump as defined by claim 1, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44 communicates with an injection valve (56).

10. A fuel injection pump as defined by claim 2, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

11. A fuel injection pump as defined by claim 3, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

12. A fuel injection pump as defined by claim 4, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

13. A fuel injection pump as defined by claim 5, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

14. A fuel injection pump as defined by claim 6, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

15. A fuel injection pump as defined by claim 7, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

16. A fuel injection pump as defined by claim 8, in which said pressure reservoir (62, 68) is acted upon by the pump pressure of the pump work pistons (29) via the control bore or control groove (57) of the rotary slide valve (46), in a rotational position different from the rotational position in which the pressure reservoir (62, 68) and/or the axial conduit (44) communicates with an injection valve (56).

* * * * *